June 14, 1949.　　M. R. FRIEDBERG　　2,473,141
OUTSIDE MOUNTED AUTOMOBILE ANTENNA
Filed April 19, 1947
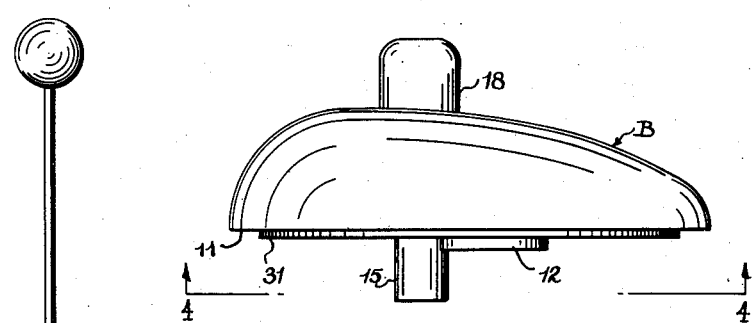
Fig. 3
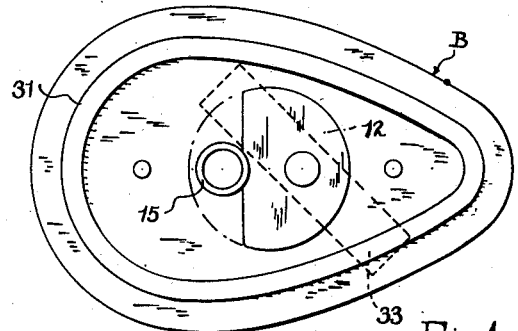
Fig. 4
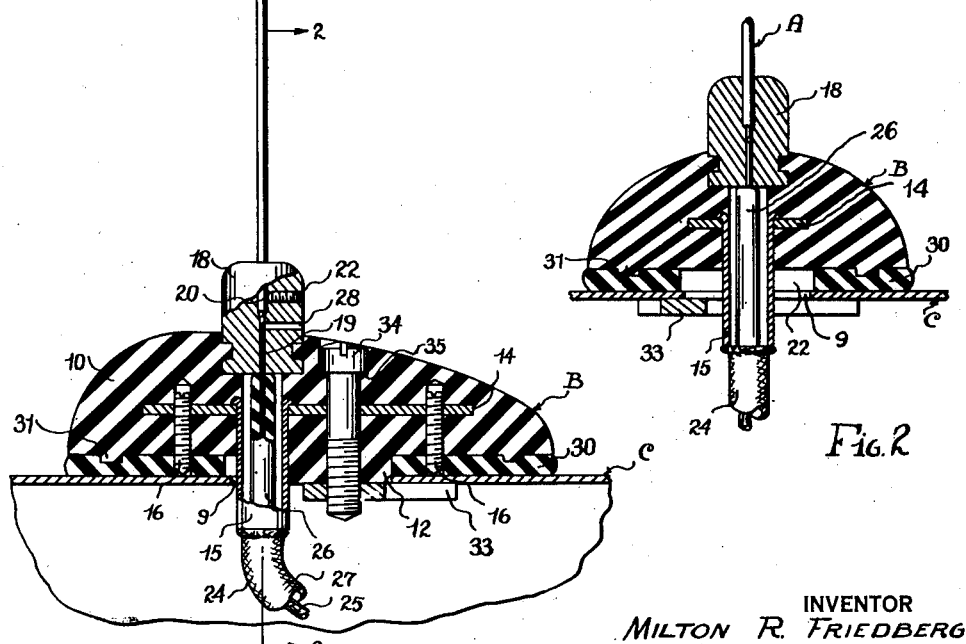
Fig. 2
Fig. 1
INVENTOR
MILTON R. FRIEDBERG
BY
Kwis, Hudson, Boughton & Williams
ATTORNEYS Patented June 14, 1949

2,473,141

UNITED STATES PATENT OFFICE 2,473,141

OUTSIDE MOUNTED AUTOMOBILE ANTENNA

Milton R. Friedberg, Cleveland Heights, Ohio, assignor to The Gabriel Company, Cleveland, Ohio, a corporation of Ohio Application April 19, 1947, Serial No. 742,636

10 Claims. (Cl. 250—33)

This invention relates to an improvement in automobile antenna mountings and, particularly, to an automobile antenna mounting which may be mounted from the outside of a car without removing the upholstery, pads, or like interior wall or roof covering adjacent the location of the antenna.

Heretofore a satisfactory antenna mounting fastened to the body of an automobile usually required that the mechanic installing the antenna had to have access to the inside of the body adjacent the location of the mount in order to secure the mount both mechanically and electrically. In mountings located on the cowl of the automobile, this required the removal of the kick pads or panels above the front-seat floor, which was likely to do no permanent harm to the inside trim of the car because such kick pads are usually held by spring types of fasteners; thus the kick pads could be pried off for installation of the antenna and snapped back in place after installation. The operation was time consuming and increased the cost of installation, and the removed interior finish panels were frequently not as secure thereafter. The problem has been particularly serious, however, where the antenna is to be mounted on the roof of the automobile, especially since the adoption of fixed length roof-top antennas for optimum reception and/or transmission of short wave. Such reception and/or transmission generally requires that the antenna be mounted at approximately the highest point on the car roof. To install such roof antenna mountings with a mounting which necessitates access to the inside surface of the metal roof requires either that the interior upholstery be cut and darned or patched at a most conspicuous location, thereby damaging the appearance of the car and reducing its resale value, or the upholstery must be substantially removed and reupholstered, thereby enormously increasing the time and cost of installation.

In view of the foregoing, it is an object of the present invention to provide an automobile antenna mounting or the like which is simple in structure, economical to manufacture, electrically efficient, and which may be mounted in an opening formed in the body of an automotive vehicle without access to the interior side thereof.

Another object of the invention is the provision of a new and novel mounting for an antenna preferably on the top of an automotive vehicle having a nut insertable through a mounting opening in the body of the automotive vehicle and engageable with the opposite side of the body upon actuation of means accessible from the exterior thereof.

Another object of the invention is the provision of a new and novel automobile antenna mounting of the type referred to, comprising a base, fastening means insertable through a mounting opening in the automotive body, and rotatable means accessible from the exterior of the base for actuating the fastening means into engagement with the interior side of the automotive body.

Still another object of the invention is the provision of a new and novel antenna mounting adapted to be installed on an automotive vehicle body without access to the interior thereof, including a base, fastening means insertable through an opening in the automotive body, rotatable means accessible from the exterior of the base for actuating the fastening means, and other means on the base preventing at least in part free rotation of the fastening means upon rotation of the rotatable means whereby the fastening means may be positively actuated from the exterior of the base.

Yet another object of the invention is the provision of a new and novel antenna mounting positionable on the body of an automotive vehicle body without access to the interior side thereof, including an insulated base member having integrally formed grounding means, and means operable from the exterior side of the base and insertable through an opening in the automotive body for fixedly positioning the base on the body and engaging the grounding means therewith.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 1 is a vertical longitudinal cross-sectional view of an antenna mounting embodying the present invention installed on a portion of the roof of an automobile;

Fig. 2 is a transverse section taken along the line 2—2 of Fig. 1;

Fig. 3 is a side elevational view of the mounting per se; and

Fig. 4 is a bottom plan view of the mounting shown in Fig. 3.

Generally speaking, the invention comprises a radio antenna mounting base particularly adapted to be mounted on the roof or otherwise of an automotive vehicle wherein access to only one side thereof is feasible, the base having generally: guide means for accurately positioning the base relative to a mounting opening, fastening means insertable through the opening and accessible from the exterior of the base to tighten same against the inside of the car body, and other means extendable through the opening for preventing the relative rotation of the fastening means during tightening or loosening thereof.

Referring to the drawings, the invention is shown as embodied in a radio antenna A, of the so-called whip or rod type, mounted or supported at its lower end on a supporting base B, in turn mounted or suitably positioned on a panel C of an automotive vehicle body or the like. The panel C shown may be any portion of an automotive vehicle body, whether sloping, vertical, or horizontal, or at the front or rear thereof, but in the embodiment shown is preferably either the central portion of the roof of the automotive vehicle or the highest point thereof. The panel C is preferably perforated or drilled with an opening 9 of suitable size to provide passage for a lead-in connection from the antenna A and passage for clamping means to fasten the base B onto the panel.

As shown, the base B comprises an insulating molded base member 10 of suitable non-conducting plastic or otherwise, such as a phenolic condensation product, preferably having a relatively flat bottom 11 and an attractive streamlined upper configuration as shown. The base may be formed of a unitary structure or of a plurality of pieces if desired. A base boss 12 projects downwardly a short distance centrally of the bottom 11 into the opening 9, serving as a guiding boss for positioning the base B relative to the opening 9. The base boss 12 in the embodiment shown is somewhat more than semicircular in shape, although it could be circular or could be comprised of a number of individual smaller bosses having an exterior general radius approximately equal to the radius of the opening 9.

In the embodiment shown, the base B also comprises a grounding plate 14 preferably positioned within the body of the base member 10 and which also carries a lead-in shielding tube 15 which projects below the boss 12. The shielding tube shown extends within but eccentrically of the projected circumference of the boss 12. At points spaced from the boss 12 the base bottom 11 has tapped apertures extending to slightly above the grounding plate 14 which receive pointed grounding setscrews 16 preferably set to project below the bottom 11 almost as far as the boss 12.

For supporting the antenna A, an antenna chuck 18, which projects above the base member 10, extends into and is fixed to the body of the base member 10 concentrically with the lead-in shield 15 and terminates above the grounding plate 14 to insulate it therefrom. The chuck 18 shown is drilled or otherwise apertured longitudinally to provide on its lower end a lead-in wire opening 19 and on its upper end an enlarged antenna base receiving socket 20. As shown the base of the antenna A is positioned in the antenna base receiving socket 20 and a setscrew 22 threaded in a tapped opening intersecting the socket 20 secures the antenna base therein. In this instance the antenna may be a fixed length antenna for short-wave transmission and/or reception. If the base B were to be used on a vertical panel and the antenna A were also to be vertical, it will be appreciated that other means of mounting the antenna might be provided.

The lead-in wire opening 19 preferably communicates, as shown, through an interior opening or bore in the base member 10 with the opening of the lead-in shielding tube 15. A lead-in cable 24, comprised generally of a radio-frequency conductor 25, an insulating covering 26, and a coaxial braided shield 27, provides a lead-in connection from the antenna chuck through the base member 10 and the opening 9 to the interior of the car body and thence to the radio receiving and/or transmitting equipment. As shown, the shield 27 extends a short distance into the lower end of the shielding tube 15 and is soldered or otherwise fixed thereto. The radio-frequency conductor 25 extends beyond the end of the braided shield into the lead-in wire opening 19 of the chuck 18 and is soldered therein by inserting a small amount of solder through a soldering opening 28 communicating the opening 19 with the exterior of the chuck 18. Other means could be provided for securing the lead-in wire 25 therein. The insulating covering 26 preferably extend interiorly of the shielding tube 15 and abuts against the lower end of the chuck member 18. With the construction shown and the shielded braid soldered to the shielding tube 15, forces tending to pull the lead-in cable 24 away from the mounting are resisted by the braided shield 27, thus relieving the radio-frequency conductor 25 of this function.

Between the bottom 11 of the base member 10 and the car panel C is a soft rubber sealing pad 30 of about the thickness of the boss 12 and having a perimeter shaped similar to that of the base member 10. The pad 30 shown is provided with suitable openings through which the boss 12, the shielding tube 15, and the grounding setscrews 16 may project. As shown, the bottom of the base member 10 may have a continuous annular bead or ridge 31 spaced from the edge thereof for compressing the pad 30 continuously around the perimeter of the base member 10 and insuring adequate sealing action when the base B is clamped in the mounted position.

For clamping the base B onto the body panel C, the invention contemplates means which are positively actuatable from the exterior of the base so as to avoid the necessity of disturbing the upholstery of the automotive vehicle in order to install the antenna mounting. In the embodiment of the invention shown, such means may take the form of a fastening member such as an elongated strap nut 33 in combination with a stop or abutment for positioning the strap nut so that its ends will bear against the underside of the body panel C when tightened. For moving the strap nut 33 into clamping engagement with the interior sides of the body panel C, the base member 10 has an opening drilled or otherwise formed therethrough eccentrically of the boss 12 and countersunk from the upper side to receive a securing cap-bolt 34 threadably engaged with the strap nut 33. The length of the strap nut is preferably greater than twice the cord of the boss 12 at the bolt 34, but not more than twice the diameter of the opening 9 less the diameter of the bolt 34. Thus the strap nut 33 may be positioned in the opening 9 by first inserting one end, moving the base together with the nut longitudinally of the length of the nut as far to one side as possible, i. e., until a side of the bolt 34 engages a side of the opening 9, dropping the other end of the nut through the opening, and then returning the base centrally of the opening 9. While any means may be provided for preventing rotation of the strap nut 33 as the fastening bolt 34 is rotatably threaded thereinto, in the embodiment shown the shielding tube 15, which as hereinbefore stated preferably extends below the lower edge of the boss 12, admirably performs this function, and when the mounting is clamped onto the body panel C the strap nut 33 generally assumes the position shown by the dot-dash lines of Fig. 4. As shown, a thin sealing washer 35 is preferably employed under the cap of the bolt 34. Additionally, the outer ends of the nut 33 may have upwardly extending sharpened lugs to dig or bite into the lower side of the body panel C.

To mount the antenna mounting described on the body panel of an automotive vehicle, the hole 9 of appropriate size to receive the boss 12 is formed at the desired position of the assembly. The lead-in cable 24 may then be fished in either direction through the hole 9 between the interior side of the panel C and the interior upholstery of the automotive vehicle to a discontinuous point of the upholstery or to the trunk or the like so as to permit the cable to continue to the radio receiving and/or transmitting equipment. If desired, the lead-in cable may first be assembled with the mounting and then inserted through the hole 9 into the interior of the vehicle, or the cable may be threaded through the upholstery and out of the hole 9 wherein it is subsequently assembled with the mounting by stripping the insulated covering 26 so as to bare the end of the conductor 25 which is then inserted into the lead-in opening 19 of the chuck 18. The conductor is secured by a touch of solder applied to the soldering opening 28. The end of the braided shield 27 is inserted in the shielding tube 15 and soldered thereto, thereby establishing a secure electrical connection as well as relieving the conductor 25 of mechanical load.

With the cable thus secured to the mounting, the cable is pushed back into the hole 9 and, with the strap nut 33 at the end of the bolt 34, one end thereof is inserted in the hole 9. The mounting is then moved across the hole until the other end of the nut falls into the hole 9. The mounting is then centered until the boss 12 fits in the hole 9. The bolt 34 is then tightened, the strap nut 33 being prevented from turning by engagement with the end of the lead-in shield 15. Just as tightening is completed, the base is turned about the boss 12 slightly to cause the setscrews 16 to scratch through the paint on the panel C. Final tightening causes the setscrews to bite into the bare metal of the panel, thereby grounding the cable shield 27 through the tube 15 and plate 14.

Any slight curvature of the panel C insures a firm grip with the nut 33 when the boss 12 is drawn into the hole 9 during final tightening. To permit the boss 12 to be drawn further into the hole 9 than shown in Figs. 1 and 2, the ends of the nut 33 may be bowed upwardly, if desired. The pad 30 takes up any differences between the slight curvature of the panel C and the flat bottom 11 of the base 10; the sealing ridge 31 insures a tight seal in the event the panel is appreciably curved at the location of the mounting.

As shown in Figs. 1 and 2, the mounted antenna mounting is secured against movement in any direction, even though it is mounted entirely from the outside of the car body. Movement in a vertical direction is prevented by the bolt 34 and nut 33; horizontal movement is prevented by the fit of the boss 12 in the hole 9; turning movement is prevented by the frictional engagement of the mounting with the panel C as well as by the bite of the setscrews 16.

It is to be understood that the invention is not to be limited to the specific embodiment disclosed. For example, obviously other types of antenna chucks may be used and when the mounting is used for a side-cowl type of mounting, the chuck should hold the antenna generally parallel to the plane of the base 10 rather than perpendicular. Likewise, instead of one boss 12, a plurality may be employed or the boss may be other than circular, e. g., of a configuration fitting a plurality of intersecting holes 9. Similarly, other fastening means than that shown may be provided or other means for preventing rotation of the strap nut 33 may be provided, or the lead-in connection might be otherwise formed. The construction shown, however, has proven satisfactory from a cost of manufacture and ease of assembly standpoint and is, therefore, the preferred embodiment.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

Having thus described my invention, I claim:

1. In an automobile antenna mounting adapted to be positioned on the outside of a car body and over an opening formed therein, a non-conducting base member engageable with the outside of the car body and extending over said opening, an antenna carrying member mounted in the outer side of the said base, a lead-in bore in said base extending from the inner side thereof to said antenna carrying member and adapted to register with the car body opening, a bolt spaced laterally from said lead-in bore and extending through said base and positioned also to pass through the car body opening and rotatable from the outer side of said base, and a clamping nut threadedly mounted on the end of said bolt inwardly of the inner side of the base and adapted to be passed through the car body opening in positioning the mounting on the car body and then brought into clamping engagement with the inner side of the car body by rotation of said bolt from the outer side of said base thereby effecting the securing of the mounting to the body solely from the exterior thereof.

2. An automobile antenna mounting as defined in claim 1 and wherein said base member is provided on its inner side with a pilot boss projecting therefrom and adapted to extend into said car body opening and engage a portion of the periphery of said opening.

3. An automobile antenna mounting as defined in claim 1 and wherein said base member is provided on its inner side with a pilot boss adapted to extend into said car body opening and engage a portion of the periphery of said opening, while said bolt extends through said boss.

4. An automobile antenna mounting as defined in claim 2 and wherein a lead-in shield is secured in said base and in said lead-in bore and extends beyond the inner side of said base and is adapted to pass through said car body opening when said mounting is installed.

5. In an automobile antenna mounting adapted to be positioned on the outside of a car body and over an opening formed therein, a non-conducting base member engageable with the outside of the car body and adapted to extend over said opening, an antenna carrying member mounted in the outer side of said base, a lead-in bore in said base extending from the inner side thereof to said antenna carrying member and adapted to register with the car body opening, a lead-in shield mounted in said base in said lead-in bore and extending beyond the inner side of said base and adapted to pass through said car body opening, a pilot boss on the inner side of said base adjacent to said lead-in bore and adapted to extend into said car body opening and engage a portion of the periphery of said opening, a bolt extending through said base and pilot boss and rotatable from the outer side of the said base, and a clamping nut threadedly mounted on the end of said bolt inwardly of the inner side of the base and beyond the end of said boss and adapted to be passed through the car body opening in positioning the mounting on the car body and then brought into clamping engagement with the inner side of the car body by rotation of said bolt from the outer side of said base to clamp the mounting to the body.

6. In an automobile antenna mounting adapted to be positioned on the outside of a car body and over an opening formed therein, a non-conducting base member engageable with the outside of the car body and adapted to extend over said opening, a grounding member within said base and provided with means adapted to contact the outside of the car body, an antenna carrying member mounted in the outer side of said base and insulated by the base from said grounding member, a lead-in bore in said base extending from the inner side thereof to said antenna carrying member and adapted to register with the car body opening, a bolt spaced laterally from said lead-in bore and extending through said base and positioned to pass through the car body opening and rotatable from the outer side of said base, and a clamping nut threadedly mounted on the end of said bolt inwardly of the inner side of the base and adapted to be passed through the car body opening in positioning the mounting on the car body and then brought into clamping engagement with the inner side of the car body by rotation of said bolt from the outer side of said base to clamp the mounting to the body.

7. An automobile antenna mounting as defined in claim 6 and wherein said base member is provided with a bore extending from the inner side of the base member toward the outer side thereof while said grounding member is provided with an aperture registering with said bore and there is adjustably mounted in said bore and aperture in electrical contact with said grounding member a screw having a pointed end adapted to contact the outside of the car body.

8. An automobile antenna mounting as defined in claim 6 and wherein said grounding member is provided with an opening registering with said lead-in bore while a lead-in shield is mounted in said bore and is connected to said grounding member and extends beyond the inner side of said base and is adapted to extend through the car body opening when said mounting is applied to the car body.

9. In an automobile antenna mounting adapted to be positioned on the outside of a car body and over an opening therein, a non-conducting base member engageable with the outside of the car body and extending over said opening and provided on its inner side with a pilot boss adapted to extend into said car body opening and engage a portion of the periphery of said opening, an antenna carrying member mounted in the outer side of said base, a lead-in bore in said base extending from the inner side thereof to said antenna carrying member and spaced laterally of said pilot boss and adapted to register with the car body opening, a grounding member within said base and provided with means adapted to contact the outside of the car body and insulated by the base from said antenna carrying member, said grounding member being provided with an aperture registering with said lead-in bore, a lead-in shield mounted in said lead-in bore and extending through said grounding member aperture and connected to said grounding member, said lead-in shield extending beyond the inner side of said base and adapted to pass through the car body opening, a bolt extending through said base and pilot boss and rotatable from the outer side of said base, and a clamping nut threadedly mounted on the end of said bolt inwardly of the inner side of the base and beyond the end of said boss and adapted to be passed through the car body opening in positioning the mounting on the car body and then brought into clamping engagement with the inner side of the car body by rotation of said bolt from the outer side of said base to clamp the mounting to the body.

10. An automobile antenna mounting as defined in claim 9 and wherein said clamping nut is in the form of an elongated bar of such length that it can engage the inner side of the car body and also engage the lead-in shield to prevent the nut turning with the bolt.

MILTON R. FRIEDBERG.

REFERENCES CITED

The following references are of record in the file of this patent:

UNITED STATES PATENTS

| Number | Name | Date |
|---|---|---|
| 1,956,623 | Pleister | May 1, 1934 |
| 2,251,889 | Ludwig | Aug. 5, 1941 |
| 2,354,314 | Harsted | July 25, 1944 |
| 2,366,634 | Ludwig | Jan. 2, 1945 |
| 2,402,556 | Judd | June 25, 1946 |